United States Patent [19]
Lonnemo et al.

[11] 3,785,398
[45] Jan. 15, 1974

[54] POWER TRANSMISSION
[75] Inventors: Kurt R. Lonnemo, Troy; Jan O. Bergstedt, Birmingham, both of Mich.
[73] Assignee: Sperry Rand Corporation, Troy, Mich.
[22] Filed: Aug. 9, 1972
[21] Appl. No.: 278,919

[52] U.S. Cl. .............................. 137/488, 137/494
[51] Int. Cl. ........................................ G05d 16/10
[58] Field of Search .................... 137/489, 488, 494, 137/492, 492.5, 489.5

[56] References Cited
UNITED STATES PATENTS
| | | | |
|---|---|---|---|
| 2,890,715 | 6/1959 | Ebersold | 137/494 |
| 3,101,738 | 8/1963 | Horlacher | 137/489 |
| 3,625,246 | 12/1971 | Reaves | 137/488 |

*Primary Examiner*—Henry T. Klinksiek
*Assistant Examiner*—Robert J. Miller
*Attorney*—Theodore Van Meter

[57] ABSTRACT

A relief valve for hydraulic power transmission systems serves not only to limit the maximum system pressure, but also to limit the rate of pressure rise in the system when subjected to sudden transients which would otherwise cause large pressure overshoots before stabilizing at the designed pressure level. The valve is opened by system pressure reacting against a spring and has the spring normally set to permit valve opening at a small fraction of the designed maximum relief pressure. System pressure also reacts upon a spring loading piston of larger area which, when moved through its full stroke, brings the spring load up to the designed maximum limit. The rate of travel of this piston is regulated by a dashpot.

9 Claims, 3 Drawing Figures

PATENTED JAN 15 1974 3,785,398
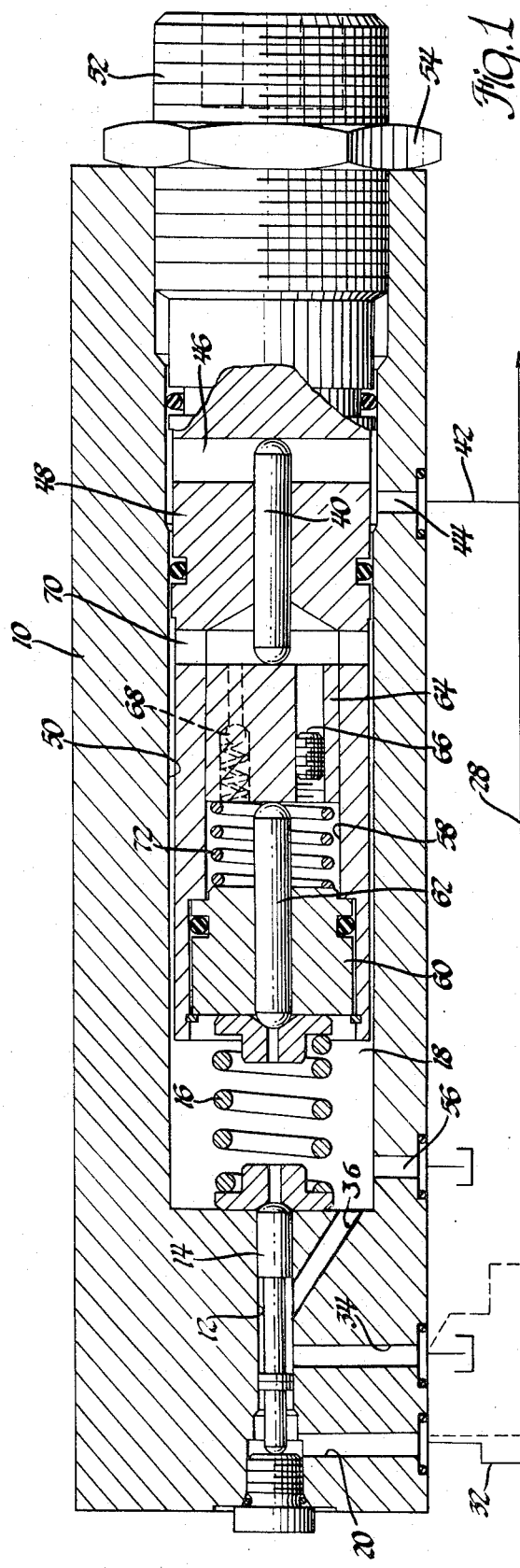
Fig. 1
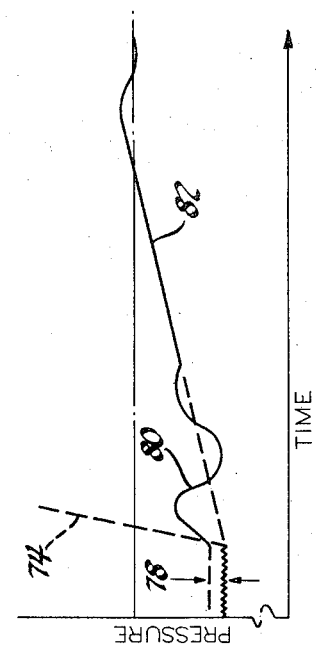
Fig. 3
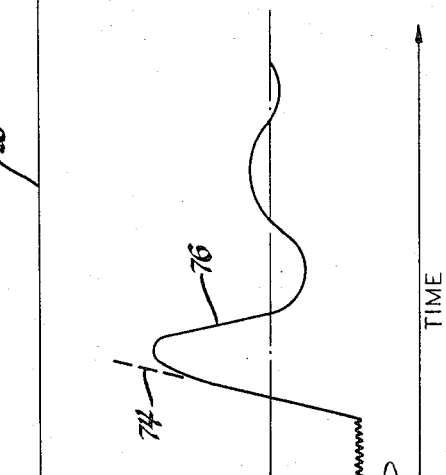
Fig. 2
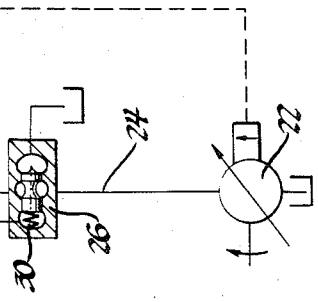

POWER TRANSMISSION

Modern hydraulic power transmission systems operate near the upper limits of pressure which can be safely accepted by the system components. Also, the valves and other controls are capable of creating very sudden transients in flow rates in the system. This requires relief valves that have a very fast response in order to prevent serious pressure overshoots. It is not uncommon with known types of relief valves to produce overshoots or pressure peaks to more than double the designed relief pressure. Such phenomena seriously limit the design criteria and, if they could be eliminated or greatly reduced, would permit a substantial rise in the operating pressure for which a modern hydraulic power system can be designed.

It is an object of the present invention to provide an improved maximum pressure relief valve which not only limits maximum pressure but also limits the rate of pressure rise in a system.

This is accomplished by providing a valve with a body having a bore with spaced inlet and outlet connections, a valve slidable in the bore and urged by inlet pressure to open to the outlet, spring means for opposing inlet pressure on the valve, and means variably urging the valve toward closed position comprising a piston having a valve-closing area larger than the opening area of the valve, and a dashpot for variably regulating the rate of travel of the piston to limit the rate of increase of inlet pressure.

IN THE DRAWING

FIG. 1 is a diagrammatic cross sectional view of a pilot relief valve incorporating a preferred form of the present invention.

FIG. 2 is a plot of pressure rise against time, typical of the performance of known relief valves.

FIG. 3 is a similar plot showing the performance of a valve using the present invention.

The valve illustrated in FIG. 1 comprises a body 10 having a relief valve bore 12 in which a spool 14 is slidably mounted and normally urged to the left by a spring 16 located in a spring chamber 18. The left end of spool 14 is exposed to the operating pressure in a hydraulic power transmission system through an inlet port 20. The spring 16 in the position illustrated exerts only a very low force on the spool 14 as, for example, 10 per cent of designed maximum pressure for the system and the parts would lie in this position only when system pressure is below that value.

A typical hydraulic power system is illustrated diagrammatically as including a pressure compensated rotary variable displacement pump 22 which delivers fluid through a line 24 to a pilot operated relief valve 26 and thence through a delivery line 28 to the fluid utilizing and controlling portions of the power system which are not illustrated and may take any suitable form. Usually systems supplied by a pressure compensated pump are of the closed center type. It will be understood, of course, that for fluid consuming systems of the open center type, a fixed displacement pump would normally be utilized instead.

The control chamber 30 of the relief valve 26 is in restricted communication with the delivery line 24 and has a control connection 32 with the inlet 20. When the spool 14 is in its lefthand position illustrated, it closes communication between inlet 20 and an outlet 34 so that full system pressure is transmitted to the left end of spool 14 at all levels below the designed cracking pressure for valve 14, in the instance cited 10 per cent of designed maximum relief pressure. Outlet 34, alternatively may be utilized to control the displacement regulating servomotor of the pump 22 as shown in dotted lines. In that case, the usual pilot relief valve will control relief valve 26 and spool 14 in conjunction with passage 36 will function as a three-way valve. While the valve 14 is shown as a sliding spool type, it will be understood that it could as well be a poppet type valve.

For the purpose of variably loading the spring 16, there is provided a piston 40 which is exposed on its right-hand end to delivery line pressure through a branch conduit 42, a port 44 in the body 10, and a cross bore 46 in a plug 48 adjustably mounted in a bore 50 of the body 10. The bore 50 is threaded at its righthand end to receive the threaded portion 52 of the plug 48 which is retained in position by a lock nut 54. At its left-hand end, the bore 50 constitutes the spring chamber 18 which is connected to reservoir through a connection 56. The plug 48 has at its left end a bore 58 closed by an end cap 60 which receives a pin 62 for applying variable loading to the spring 16. A piston 64 slidable in the bore 58 transmits mechanical motion from piston 40 to pin 62. An orifice plug 66 connects the opposite ends of the piston 64 as does optionally a check valve 68. The right-hand end of bore 58 is connected to reservoir by a cross bore 70 and by the clearance between plug 48 and bore 50. An independent spring 72 in bore 58 urges the piston 64 and piston 40 to the right when the system pressure in bore 46 permits.

In operation, whenever the system pressure rises above the assumed 10 per cent of maximum rated pressure, the main spring 16 will be subject to two opposing forces, namely system pressure acting on the left end of spool 14 and same system pressure acting on the right end of piston 40. Since piston 40 is of a somewhat larger diameter than spool 14, the right end of spring 16 will be shifted to the left and spool 14 will not open until piston 40, piston 64 and pin 62 have moved leftwardly to the limit of their strokes. In so moving, the spring 16 will be loaded to the value necessary to maintain maximum pressure in the system and any pressure beyond that will force spool 14 to the right and it will act as a pilot relief valve in the usual manner. The foregoing description applies when the rate of pressure rise in the power system is slow.

It will be seen that the piston 64 and the orifice 66 constitute a dashpot which regulates or retards the speed of travel of piston 40 to the left; thus, on more sudden flow transients in the system, the speed of piston 40 to the left is limited by the dashpot and spool 14 will therefore open at a level below designed maximum pressure. Thereafter, the rate of pressure rise in the system will be determined by the rate of leftward travel of piston 40 which is in turn determined by the area of piston 64 and the size of the orifice 66. When system pressure again falls below designed maximum, the independent spring 72 will restore pistons 64 and 40 to their at-rest positions illustrated and, if the check valve 68 is included, this return may be quite rapid.

FIGS. 2 and 3 contrast the performance of a conventional relief valve with the pressure rate controlled relief valve of the present invention, the latter being illustrated in FIG. 3. If, for example, a transient in the system would otherwise cause pressure to rise at a rate indicated by the slope of the dash line 74, the performance of the conventional valve shown in FIG. 2 produces fluctuations which may peak initially to very high levels much above the design maximum, such as indicated by the trace 76. With the valve of the present invention on the other hand, its response to the same rate of pressure rise in the system causes an opening of the valve at a level only a small amount 78 above the instantaneous operating pressure and the fluctuation, as indicated by the trace 80, will remain below the maximum design pressure. The rate of pressure rise will settle down to a rate indicated by the slope of the line 82. The traces 76 and 80–82 are representative of actual performances recorded in laboratory experiments with conventional valves and with valves incorporating the present invention.

Adjustment of the initial pressure setting of spring 16 may be made by loosening lock nut 54 and moving the plug 48 inwardly or outwardly. The present construction also avoids the need for extremely small orifices which are expensive to manufacture with repeatable precision. The large area of piston 64 in relation to piston 40 produces a sizable fluid displacement in the bore 58 and this in turn allows the use of a restrictor plug 66 having an orifice of sufficient size to be easily manufactured accurately. It will be understood also that the independent spring 72 may be omitted and reliance placed upon main spring 16 alone to oppose the force of piston 40.

We claim:

1. A fluid pressure relief valve responsive to the rate of pressure rise in a fluid power system comprising a body having a bore with spaced inlet and outlet connections, a valve slidable in the bore and urged by inlet pressure to open to the outlet, spring means for opposing inlet pressure on the valve and means variably urging the valve toward closed position comprising a piston having a vlave-closing area larger than the opening area of the valve, and a dashpot for variably regulating the rate of travel of the piston to limit the rate of increase of inlet pressure.

2. A valve as defined in claim 1 wherein an independent spring is incorporated in the dashpot.

3. A valve as defined in claim 1 wherein the valve-closing force of the piston is applied to increase the spring load on the valve.

4. A valve as defined in claim 1 wherein the relief valve is a pilot relief valve connected to a balanced relief valve to control the latter.

5. A valve as defined in claim 3 wherein the relief valve is a pilot relief valve connected to a balanced relief valve to control the latter.

6. A valve as defined in claim 3 herein the relief valve is a pilot relief valve connected to control the displacement regulator of a variable displacement pump.

7. A valve as defined in claim 3 wherein the relief valve is a pilot relief valve connected to control the displacement regulator of a variable displacement pump.

8. A valve as defined in claim 3 which includes means for adjusting the minimum spring load applied to the valve by the piston.

9. A valve as defined in claim 8 wherein the last-named means comprises an adjustable stop for the spring means and the piston is carried by the adjustable stop.

* * * * *